United States Patent [19]
Rosen

[11] 4,157,453
[45] Jun. 5, 1979

[54] CRYPTOGRAPHIC TELEGRAM TRANSMISSION SYSTEM

[76] Inventor: Leo Rosen, Apt. C, Heritage Apartments, River Rd., Essex, Conn. 06426

[21] Appl. No.: 558,067

[22] Filed: Oct. 10, 1944

[51] Int. Cl.² .......................... H04K 1/06; H04L 9/00
[52] U.S. Cl. ........................................................ 178/22
[58] Field of Search ........................................ 178/22

[56] References Cited
U.S. PATENT DOCUMENTS

| | | |
|---|---|---|
| 2,453,659 | 11/1948 | De Regnauld de Bellescize ... 178/22 |
| 2,539,556 | 1/1951 | Steinberg ................................ 178/22 |
| 2,984,700 | 5/1961 | Small ..................................... 178/22 |

*Primary Examiner*—Howard A. Birmiel
*Attorney, Agent, or Firm*—John R. Utermohle

EXEMPLARY CLAIM

1. In a communication system including the representation of different characters by normally dissimilar groups of impulses, the method of enciphering a message which includes transposing the impulses from place to place within the respective character groups and from one character group to another.

12 Claims, 7 Drawing Figures

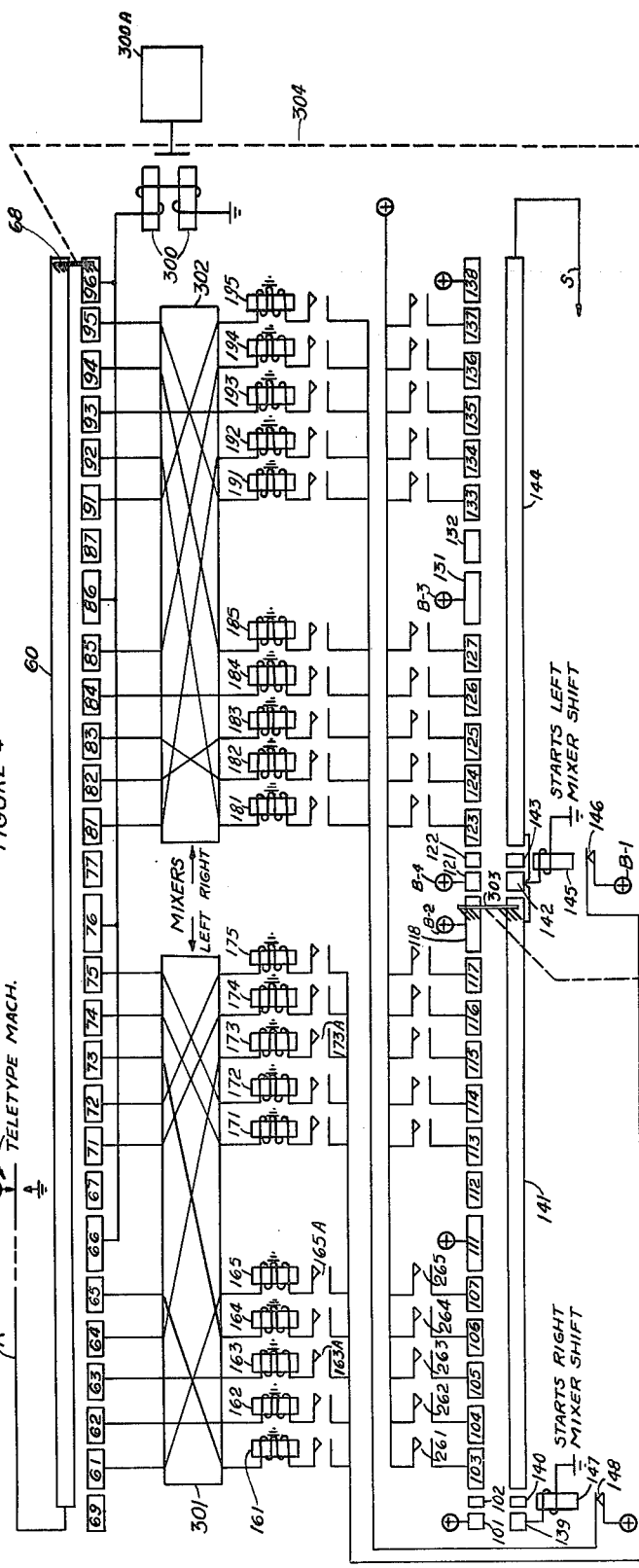

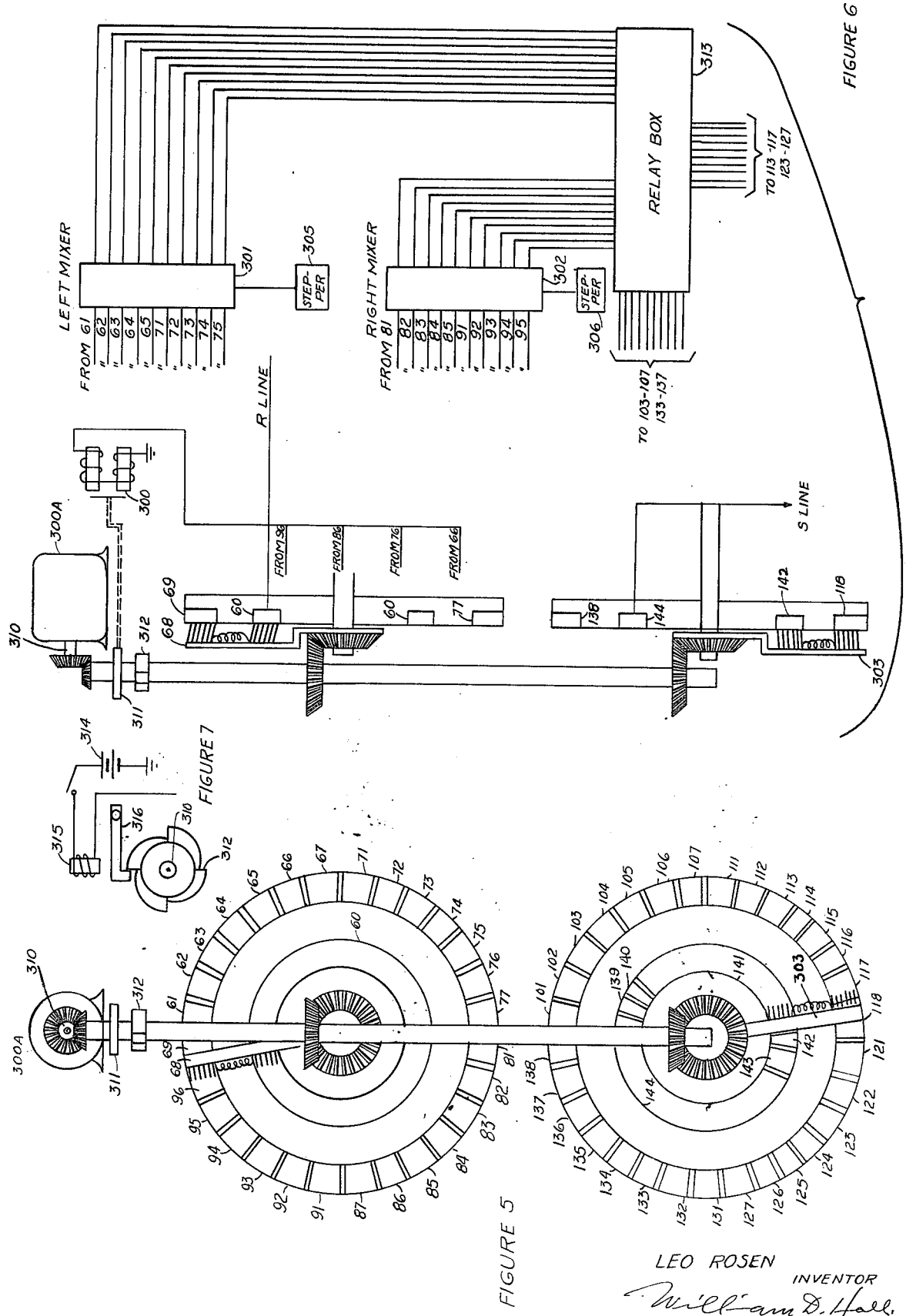

CRYPTOGRAPHIC TELEGRAM TRANSMISSION SYSTEM

This invention relates to the art of secret communications, and particularly embodies means and apparatus for electrically enciphering communications signals and deciphering the same.

It is an accepted fact in both military and commercial electrical communications that interception of messages by unauthorized persons may be accomplished with relative ease, and it is thus necessary for military security and for commercial and personal privacy to encode or encipher messages transmitted by electrical means.

A great deal of work has been done in secret communications systems and in methods of means for breaking them. Furthermore, the volume of enciphered communication has constantly increased. As a result, certain criteria have been established in connection with ciphering systems, for example (1) the encipherment should be accomplished by mechanical or electromechanical means, (2) the means should be operable by persons without extended special training, and (3) since a machine will almost inevitably repeat itself, its cycle must be made very complex.

It is the principal object of my invention to provide a ciphering apparatus and method meeting the above requirements.

Another object is to provide means for enciphering and deciphering electrical communications signals comprising a sequential arrangement of "current" and "no current" intervals or "mark" and "no mark" intervals.

A further object is to provide novel means for enciphering electrical signals comprising a series of groups of current and no current intervals or the like.

An additional object is to provide means for enciphering a signal composed of groups of current and no current intervals by transposing the intervals among the groups.

Other objects will be apparent from a reading of the following specification and claims.

The invention is specifically directed to the encryptment of Teletype signals, but the principles involved are equally applicable to the treatment of any signal which assumes or can be reduced to a sequence of marking and spacing values. Standard teletype machines, such as have been developed by the Teletype Corporation, Chicago, Ill., can be used as can commercial communications circuits.

As is well known, the Teletype machine utilizes a typewriter-like keyboard. Customarily, its output is a series of five-element signals, a signal being generated each time a type key is pressed. During transmission by a conventional machine, the pressing of the A key, for example, results in a signal consisting of two intervals of current followed by three intervals of no current. The pressing of the V key results in a five-part signal consisting of an interval of current, two intervals of no current and two intervals of current. It is common practice to refer to the current intervals as marking intervals or impulses and the no-current intervals as spacing intervals or impulses, and any of these terms may be used in the following description.

The generation of these signals and their transmission and reception are well known to those skilled in the art, and further description herein will be incidental only.

Considered in simple terms, the invention confuses or scrambles the outgoing message by transposing the impulses not only within the respective letter groups but also from one group to another. The method and the result will be clarified below and will not be elaborated upon at this point.

In the drawings:

FIG. 1 is a schematic diagram of a circuit intended to transmit and receive the encrypted signals resulting from the use of the present invention.

FIG. 2 represents in diagram the output of a standard Teletype machine.

FIG. 3 illustrates typical output signals of a Teletype machine (the signals of FIG. 2) after the transposition effected by this invention has occurred.

FIG. 4 is a schematic diagram of my preferred means for transposing Teletype signals.

FIG. 5 is a representation of a suitable arrangement of the principal mechanical elements of the invention.

FIG. 6 is a side elevation of the structure of FIG. 5 illustrating also wiring and certain other features not shown in FIG. 5; the showing is diagrammatic.

FIG. 7 is a detail of a braking device used with the invention.

In general, the apparatus herein described and shown comprises means for storing or "remembering" current and no current intervals with locking relays. The closing of the individual relays is governed by a mixer, the wiring and other features of which are well known only by friendly forces. The arrangement and wiring may be changed at will. The mixer may consist of one or more cryptographic rotors of a type well known.

The opening of the relays after they are locked is independent of their closing. The input of the mixer is fed by the pulses received from the Teletype machine, and the output thereof depends on the order of the pulses from that machine as well as on the hookup and operation of the mixer.

In FIG. 1 there is shown a Teletype transmitting machine, 10, coupled to a Teletype receiving machine, 13. Interposed in the circuit at the transmitting station is the enciphering means, 11, which scrambles the signals in an irregular manner as will hereinafter appear, while at the receiving station a deciphering means, 12, similar to the means 11 is employed. The line L represents any customary form of connection as, for example, telephone lines or telegraph lines. The signals may also be carried by radio.

The system of electrical contacts in a standard distributor will not be described in detail. Suffice it to say that each time a type key is pressed a rotating contact arm sweeps over seven fixed contacts on a distributor to provide one "start" impulse, five marking or spacing impulses, and one "stop" impulse. The arrangement of the marking and spacing impulses determines the type bar which will be actuated in the receiving apparatus. The stop impulse serves to stop the main shaft of the receiving apparatus. The rotary brush of the sending distributor always comes to rest on a stop contact. All of this is standard Teletype practice.

Pulse 21 is transmitted by sending machine 10 just as brush 68 passes over contact segment 61. The signal is passed through mixer or scrambler 301 and thereupon energizes relay 165 and closes the contacts at 165A. These contacts are locked closed by means of a circuit including a battery, B-1, contact 146 and contacts 165A, and ground at the center of the winding of relay 165. At the same time, contacts at 265 are closed, their movable element being physically connected to the movable element of relay 165. The next pulse, 22, passes into receive line R, into contact segment 62 and energizes relay 162, at the same time closing a locking circuit similar to the one just mentioned from batter B-1 to a ground in the center of the energizing coil of relay 162. When the next pulse, 23, enters receive line R, the brush 68 is in contact with bar 63, and relay contacts 163A and 263 are closed and locked. During the next time interval there is no pulse, and relay 173, associated with contact bar 64, is not energized. During the fifth interval, no pulse is transmitted, and so relay 161 also remains open. At the end of the five time intervals, stop pulse 26 is transmitted through contact bar 66 to selector magnets 300, to stop the main shaft driven by motor 300A. The motor itself continues to run. The drive is so arranged that the brush 68 will always come to rest on a stop bar, as 66.

When the next key is depressed, the above outlined operations are repeated with, of course, a different arrangement of current and no current impulses.

After the scrambling of the characters diagramed in FIG. 2, the contacts of the several relays 161 through 165, 171 through 175, 181 through 185 and 191 through 195 will have been put into the conditions indicated below.

| | |
|---|---|
| 161 open | 181 closed |
| 162 closed | 182 closed |
| 163 closed | 183 closed |
| 164 closed | 184 closed |
| 165 closed | 185 open |
| 171 open | 191 closed |
| 172 closed | 192 open |
| 173 open | 193 closed |
| 174 closed | 194 open |
| 175 open | 195 open |

A brush 303 sweeps the bars 101 through 107 plus 111 through 118, 121 through 127 plus 131 through 138, and the bars 139 through 144; brush 303 is connected by arm 304 to the brush 68 and moves synchronously therewith. For the purposes of this invention, however, brush 303 must lag behind brush 68. As illustrated in the diagram of FIG. 4, the lag amounts to 180 degrees. The arm 304 is driven by motor 300A. As the brush 303 moves past the several bars, the send line S is intermittently energized.

In FIG. 4, brush 303 is shown at rest on stop bar 118. At this point, a signal from battery B-2 is transmitted over the send line S, and this signal serves to brake the main shaft of the receiving apparatus. When a key is pressed on the sending machine, the battery circuits for both sending and receiving machines are opened, and the main driving shafts of the two apparatuses begin to rotate.

As brush 303 crosses contact bar 121, a no-current impulse is transmitted over the send line. This no-current interval which follows a stop signal serves to time the receiving apparatus. As the brush sweeps the bars 123 through 127 and 133 through 137, send line S is energized or not depending upon whether the relays connected to the several bars are closed. When, for example, the brush is on bar 123, a marking signal is transmitted. The same is true when the brush contacts bars 124, 125 and 126. A spacing impulse or no-current interval is transmitted from contact bar 127 since its associated relay is not energized. The brush comes to rest again on stop bar 131 through which a signal, originating in battery B-3, is transmitted to stop the main shaft of the receiving apparatus once more.

When the brush 303 passes bar 121, bar 142 and solenoid 145 are energized by battery B-4, thereby to open contacts 146 and de-energizing the locking circuits for relays 161 through 165 and 171 through 175. When the brush 303 passes segment 101, bar 139 is energized, thus controlling relay 147 to break the contacts 148 and open the locking circuits of relays 181 through 185 and 191 through 195. Hence, the relays are restored to an open condition after their purpose has been served. Relay contacts 261 through 265, etc., are opened substantially simultaneously with those just mentioned in the same order. Buffer contacts 102, 122, 140, and 143 are interposed as indicated so that the width of the brush will not short circuit adjacent operating bars and put battery current thereon.

The construction and operation of the contact discs or mixers 301 and 302 will be apparent to those skilled in the art without elaborate description. The showing of FIG. 4 is, of course, diagrammatic. Each unit comprises a disc of Bakelite or similar material, a plurality of fixed contact members (ten in the embodiment shown) embedded in each of the opposite faces thereof. Ordinarily, there will be the same number of contacts on the two faces. Arranged to bear against one face and the contacts thereon are spring contact arms similar in number to the contacts in the disc face. Cooperating with the other face is moving contact brush 68, driven by motor 300A, adapted to impress signal conditions upon the several contacts in succession.

The contacts on one disc face are ordinarily not connected to opposite contacts on the other face. As has been explained, and as shown in FIG. 4, the connections are such as to scramble the signals. Thus, counting from the left in FIG. 4, the first input contact is connected to the fifth output contact, the second and third input contacts to the second and third output contacts, respectively, the fourth input to the eighth output and so forth. Since the output contacts 101 through 107, 111 through 117, etc., are swept in order from left to right, the sequence of impulses reaching the send line S bears little or no resemblance to the input sequence.

Enciphered text prepared by the system so far described with the transposition impulses from one letter group to another letter group is quite complex. Further, however, each mixer is mounted for rotation, and means indicated at 305 and 306 (FIG. 6) are provided for rotating the same. These means may be electrical or mechanical. Stepper 305 is associated in any desired manner with solenoid 145 and stepper 306 with solenoid 147. The result is that, whenever brush 303 crosses contact 142 to energize solenoid 145, the left mixer 301 is caused to rotate some pre-arranged number of steps. When contact 139 is swept, the right mixer 302 rotates.

A mixer suitable for the purposes of this invention may be found fully explained in the patent to Hebern, U.S. Pat. No. 1,683,072.

FIGS. 5 and 6 illustrate a possible mechanical organization of the apparatus of FIG. 4. The upper commutator embodies the elements shown above the mixers in FIG. 4 while the lower includes the similar elements below the mixers.

The shaft 310 on motor 300A is adapted to drive through suitable gearing brushes 68 and 303. Between the motor and the brushes are arranged a friction drive 311 and a braking means 312.

The impulses from the R line, it will be seen, enter the system through contact ring 60. They are then, as has been described, fed by rotating brush 68 to contact segments 61 through 67, 71 through 77, 81 through 87, and 91 through 96, and 69. From there the letter impulses are taken through individual lines, not shown in full but indicated in FIG. 6, to mixers 301 and 302. The start and stop signals are not scrambled.

The impulses, after mixing, serve to energize relays 161 through 165, 171 through 175, 181 through 185, 191 through 195 and to set their associated contacts, 161A through 165A, etc., and illustrated in FIG. 6 as a relay box, 313. The outputs of the several contacts of the last mentioned group are fed to the contact segments 103 through 107, 113 through 117, 123 through 127, and 133 through 137. The rotating brush member 303 picks off the impressed voltages and feeds them through the ring members 141 and 144 to the send line S.

As mentioned, brush 303 will always come to rest on a stop contact, such as at 118. When a key on the sending set 10 is pressed, battery current from battery 314, FIG. 7, flows through winding 315 to lift latch 316 momentarily, and this permits shaft 310 to rotate one-quarter turn. It will be apparent, especially from FIG. 4, that contact segment 142 (corresponding to start segment 121) is not connected to the ring members 141 and 144 or otherwise to send line S. It, therefore, occurs that, after a key is depressed on the sending machine, a space impulse is first transmitted, and it is this impulse which times the starting of the motor at the receiving apparatus. Contact 121 also provides, through its associated battery, impulses to step the left mixer 301.

It should be understood that, although FIG. 1 of the drawings herein illustrates a conventional application of my invention, the usefulness of the enciphering device can be multiplied in various ways. If desired, two or more of the devices can be used in a single line or one or more of them can be used with virtually any other means for enciphering teletype-like signals.

The apparatus shown and described can be utilized for reception as well as for transmission, the only modification necessary being the substitution of mixing devices which will provide scrambling reciprocal to the scrambling accomplished before transmission.

The specific nature of the foregoing description should not be construed as limiting the invention, for the true scope of which reference should be had to the appended claims.

I claim:

1. In a communication system including the representation of different characters by normally dissimilar groups of impulses, the method of enciphering a message which includes transposing the impulses from place to place within the respective character groups and from one character group to another.

2. The method of secret communication by means of characters which includes generating for successive characters normally dissimilar groups of electrical impulses, and transposing before transmission the impulses from place to place within the character groups and from one group to another.

3. The method of secret communication by means of characters which includes generating for successive characters normally dissimilar groups of electrical impulses, transposing certain of the impulses from place to place within their groups and from one character group to another, and transmitting the modified groups.

4. In a communication system including the representation of different characters by normally dissimilar groups of n impulses each, the method of enciphering a message which includes storing in a succession of groups of n impulses each the impulses of a plurality of characters the said impulses being intermixed within their groups and from group to group, and transmitting the said impulses in their intermixed succession.

5. In an apparatus of the nature described, the combination of means for generating successive groups of electrical impulses representing successive characters in a message to be transmitted, impulse storing means arranged in some predetermined order, means for applying the successive impulses of successive groups to said storing means in order independent of the order of arrangement of the storing means certain of said impulses being displaced within their groups and certain others of said impulses being displaced to other groups, and means for transmitting the impulses in groups similar in length to the first-mentioned groups according to the order of arrangement of said storing means.

6. An apparatus according to claim 5, further characterized by means for re-arranging the impulses and groups in their original order, and means for converting the successive groups of impulses into printed characters.

7. The invention of claim 5, further characterized by means for changing the storing order of the impulses of certain of the groups.

8. The invention of claim 5, further characterized by means for changing the storing order of the impulses of certain of the groups at predetermined intervals.

9. The invention of claim 5, further characterized by means for varying the storing order of certain groups of impulses relative to the order of other groups.

10. In an apparatus of the nature described, the combination of means for generating successive groups of electrical impulses representing successive characters in a message to be transmitted, a plurality of groups of relays having movable electrical contacts, each group comprising relays equal in number to the impulses in a normal group of impulses, means for distributing the impulses of a group of impulses among a plurality of groups of said relays thereby to energize certain of the relays, means for distributing the other impulses among said relays thereby to actuate certain relays not already energized, means for locking the contacts of the actuated relays, and means independent of the order of energization of said relays for transmitting said impulses and for unlocking the contacts of the relays.

11. In an apparatus of the nature described, the combination of means for generating successive groups of electrical impulses representing successive characters in a message to be transmitted, a plurality of groups of multicontact switches, each group of switches being at least equal in number to the impulses of a normal group of impulses, variable mixing means for distributing the impulses of a plurality of groups of impulses among a plurality of groups of said switches thereby to cause certain of the switches to assume a conducting condition, means for distributing the impulses of another plurality of groups of impulses among another plurality of groups of switches, means for restoring said switches, and means for varying the mixing means.

12. In an apparatus of the nature described, the combination of means for generating successive equilength groups of two-level electrical signals said groups representing successive characters in a message to be transmitted, a distributor having a plurality of contacts thereon and an arm rotating in synchronized relation to the generation of said groups thereby to sweep successive contacts as successive impulses are generated, means for intermixing certain of the impulses of a plurality of groups thereof and for leaving others of said impulses within their original groups, a second distributor having a plurality of contacts and an arm rotating in synchronism with the generation of said impulses but lagging behind the arm of said first-mentioned distributor an angular distance depending upon the number of characters the impulses of which are intermixed for sweeping said last-mentioned contacts.

* * * * *